(12) United States Patent
Kwon et al.

(10) Patent No.: US 12,071,188 B2
(45) Date of Patent: Aug. 27, 2024

(54) VARIABLE CHASSIS PLATFORM AND MOBILITY VEHICLE INCLUDING THE SAME

(71) Applicants: Hyundai Motor Company, Seoul (KR); Kia Corporation, Seoul (KR)

(72) Inventors: Seok Ryung Kwon, Seoul (KR); Hyeon Sik Shin, Hwaseong-si (KR); Pan Keun Baek, Osan-si (KR); Jun Hwan Park, Seoul (KR); Hun Keon Ko, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/835,301

(22) Filed: Jun. 8, 2022

(65) Prior Publication Data

US 2023/0143465 A1 May 11, 2023

(30) Foreign Application Priority Data

Nov. 10, 2021 (KR) .................. 10-2021-0154214

(51) Int. Cl.
*B62D 63/02* (2006.01)
(52) U.S. Cl.
CPC .................. *B62D 63/025* (2013.01)
(58) Field of Classification Search
CPC .. B62D 63/025; B62D 21/14; B62D 49/0678; B60B 35/10; B60G 2300/40
See application file for complete search history.

(56) References Cited

U.S. PATENT DOCUMENTS

| | | | |
|---|---|---|---|
| 7,717,210 B2 | 5/2010 | Mahy et al. | |
| 8,540,272 B1 * | 9/2013 | Vitale | B62D 47/003 |
| | | | 280/638 |
| 10,232,882 B2 | 3/2019 | Bertezzolo | |
| 11,702,161 B2 * | 7/2023 | Hwang | B62D 49/0678 |
| | | | 180/209 |
| 2009/0008918 A1 * | 1/2009 | Hall | B62D 21/14 |
| | | | 280/781 |
| 2011/0254305 A1 * | 10/2011 | Gogola | B60P 3/34 |
| | | | 296/26.13 |
| 2017/0253271 A1 | 9/2017 | Bertezzolo | |
| 2018/0237086 A1 * | 8/2018 | Evans | H02J 7/00 |
| 2020/0009965 A1 * | 1/2020 | Webb | B62D 63/025 |
| 2020/0139802 A1 * | 5/2020 | Nagasaka | B60K 17/356 |
| 2020/0223485 A1 * | 7/2020 | Wang | B62D 21/02 |
| 2021/0061357 A1 * | 3/2021 | Braun | B62D 21/12 |
| 2022/0041042 A1 * | 2/2022 | Drabon | B60L 50/60 |

(Continued)

FOREIGN PATENT DOCUMENTS

| | | |
|---|---|---|
| EP | 3201069 B1 | 12/2019 |
| JP | 2012091687 A | 5/2012 |

(Continued)

*Primary Examiner* — Jason D Shanske
*Assistant Examiner* — Shams Dhanani
(74) *Attorney, Agent, or Firm* — Slater Matsil, LLP

(57) ABSTRACT

An embodiment variable chassis platform includes a body part having an interior space, an extension part configured to be inserted into the interior space of the body part along a first direction that crosses an upward/downward direction and an opposite direction thereto, a fixing part configured to fix the extension part to a specific location, and a wheel part coupled to one end of the extension part.

15 Claims, 13 Drawing Sheets

(56) References Cited

U.S. PATENT DOCUMENTS

| | | | |
|---|---|---|---|
| 2022/0063424 A1* | 3/2022 | Blankenship | B60L 50/66 |
| 2022/0135158 A1* | 5/2022 | Lee | B60L 53/80 |
| | | | 180/58 |
| 2022/0194205 A1* | 6/2022 | Persson | B60L 58/26 |
| 2022/0258749 A1* | 8/2022 | Nordbruch | B62D 63/025 |
| 2022/0348260 A1* | 11/2022 | Harmon | B62D 63/025 |

FOREIGN PATENT DOCUMENTS

| | | | |
|---|---|---|---|
| JP | 2013233895 A | 11/2013 | |
| KR | 20130032670 A | 4/2013 | |
| KR | 20170037287 A | 4/2017 | |
| KR | 102029678 B1 | 10/2019 | |
| KR | 20200032383 A | 3/2020 | |

* cited by examiner

VARIABLE CHASSIS PLATFORM AND MOBILITY VEHICLE INCLUDING THE SAME

CROSS-REFERENCE TO RELATED APPLICATIONS

This application claims the benefit of Korean Patent Application No. 10-2021-0154214, filed on Nov. 10, 2021, which application is hereby incorporated herein by reference.

TECHNICAL FIELD

The present disclosure relates to a variable chassis platform and a mobility vehicle including the same.

BACKGROUND

In general, a platforming strategy of designing a vehicle platform that shares some common components is widely used in the automobile manufacturing industries for the reason of reduction of component costs due to economy of scale and easiness of change of designs.

In particular, an electric vehicle includes one lower platform, and various kinds of upper cabins are fixed to the lower platform, so that a method of producing various kinds of electric vehicles according to purpose is possible. For example, an upper cabin manufactured according to purpose, such as a food truck, an ambulance, or unmanned delivery, is installed in a lower platform, in which a driving unit is installed, or an existing upper cabin is replaced by an upper cabin for another purpose, so that different kinds of vehicles may be manufactured according to necessities. This is called a purpose built mobile vehicle or a purpose built vehicle (PBV), and corresponds to a base of future industries suggested by several vehicle manufacturers.

Meanwhile, because a length of an upper cabin along a forward/rearward direction may be different according to a purpose thereof, a length of one lower platform along a forward/rearward direction has to be changed such that various upper cabins are applied to the lower platform. However, when the length of the lower platform is changed, it takes much time to disassemble and reassemble related parts and operations are complex.

SUMMARY

Embodiments of the present disclosure can solve problems occurring in the prior art while advantages achieved by the prior art are maintained intact.

An embodiment of the present disclosure provides a variable chassis platform that may easily change a length thereof along a forward/rearward direction, and a mobility vehicle including the same.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment, a variable chassis platform includes a body part having an interior space, an extension part that is inserted into the interior space of the body part along a first direction that crosses an upward/downward direction and an opposite direction thereto, a fixing part that fixes the extension part to a specific location, and a wheel part coupled to one end of the extension part.

In another example, the extension part may include an extension member extending along the first direction, and a protrusion member protruding from the extension member in a second direction that crosses the first direction.

In another example, the fixing part may include a fixing member being movable along the second direction, and a plurality of holes formed in the fixing member, and arranged along the first direction such that the protrusion member is inserted thereinto.

In another example, the fixing part may further include an operation member coupled to the fixing member and the body part, and that moves the fixing member forward and rearward in the second direction and an opposite direction thereto.

In another example, the extension part may include an extension member extending along the first direction, and a boss member protruding from the extension member upwards.

In another example, the fixing part may include a rotary member being rotatable about an axis extending along the upward/downward direction, and a guide groove formed in the rotary member and into which the boss member is inserted, and the guide groove may guide the boss member such that the boss member is moved along the first direction when the rotary member is rotated.

In another example, the guide groove may have a shape that surrounds a center of the rotary member, and a distance between one end of the guide groove in an extension direction, in which the guide groove extends, and the center of the rotary member may be larger than a distance between an opposite end of the guide groove in the extension direction and the center of the rotary member.

In another example, the guide groove may have a shape, of which a distance from the center of the rotary member increases as it goes toward the one end of the guide groove in the extension direction.

In another example, when a rotational direction from the one end toward the opposite end of the guide groove is a first rotational direction, the boss member may be moved in the first direction when the rotary member is rotated in the first rotational direction, and the boss member may be moved in the opposite direction to the first direction when the rotary member is rotated in an opposite direction to the first rotational direction.

In another example, four extension parts and four guide grooves may be provided, and lines obtained by connecting ends of, among the four guide grooves, two adjacent guide grooves and the center of the rotary member may be perpendicular to each other.

In another example, lines obtained by connecting opposite ends of, among the four guide grooves, the two adjacent guide grooves and the center of the rotary member may be perpendicular to each other.

In another example, one end and an opposite end of the guide groove in the extension direction and the center of the rotary member may be disposed on one line.

In another example, a width of the guide groove may correspond to a size of the boss member.

In another example, the wheel part may include a shaft member extending in the upward/downward direction, a motor member that rotates the shaft member about an axis that extends in the upward/downward direction, and a wheel member coupled to a lower end of the shaft member and that contacts a ground surface.

According to another embodiment, a mobility vehicle includes a variable chassis platform, of which a length along a first direction that crosses an upward/downward direction is variable, and a cabin seated on an upper side of the variable chassis platform and covering a portion of the variable chassis platform on the upper side of the variable chassis platform, and the variable chassis platform may include a body part and an extension part protruding from the body part along the first direction and an opposite direction thereto.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
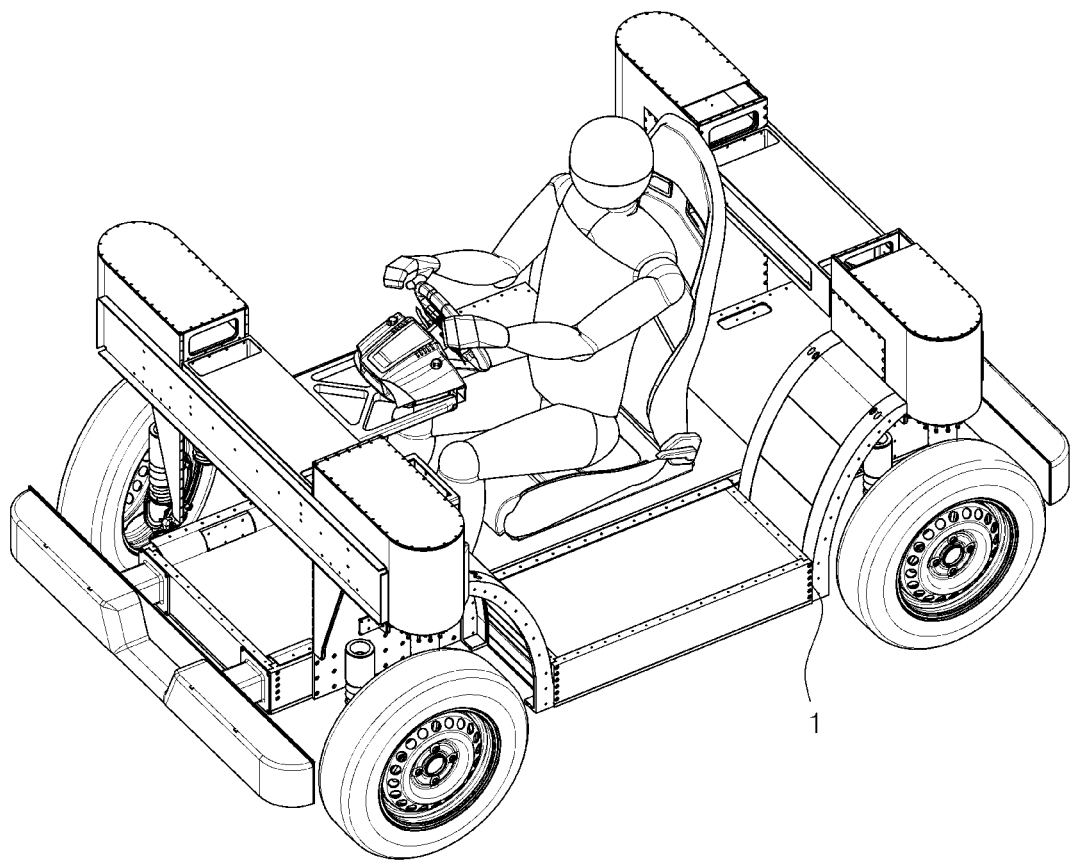
FIG. 1 is a view illustrating an example of a variable chassis platform according to embodiments of the present disclosure.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

A variable chassis platform according to an embodiment of the present disclosure relates to a variable chassis platform that may be applied to a purpose-based mobility vehicle such that a length thereof along a forward/rearward direction may be changed. Prior to a detailed description of a variable chassis platform according to an embodiment of the present disclosure, a mobility vehicle, to which the variable chassis platform according to the embodiments of the present disclosure may be applied, will be described. The mobility vehicle may be a vehicle, but the present disclosure is not limited thereto, and it should be understood that the mobility vehicle generally refers to all means that may be driven by using power.

The mobility vehicle may include a variable chassis platform 1 and a cabin 2. A length of the variable chassis platform 1 along a first direction D1 (see FIG. 4) that crosses an upward/downward direction may vary. Here, the first direction D1 may be a forward/rearward direction. Then, the first direction D1 may be a concept that does not mean one direction but means directions, in which an extension member 21, which will be described below, extends.

Figure 2:
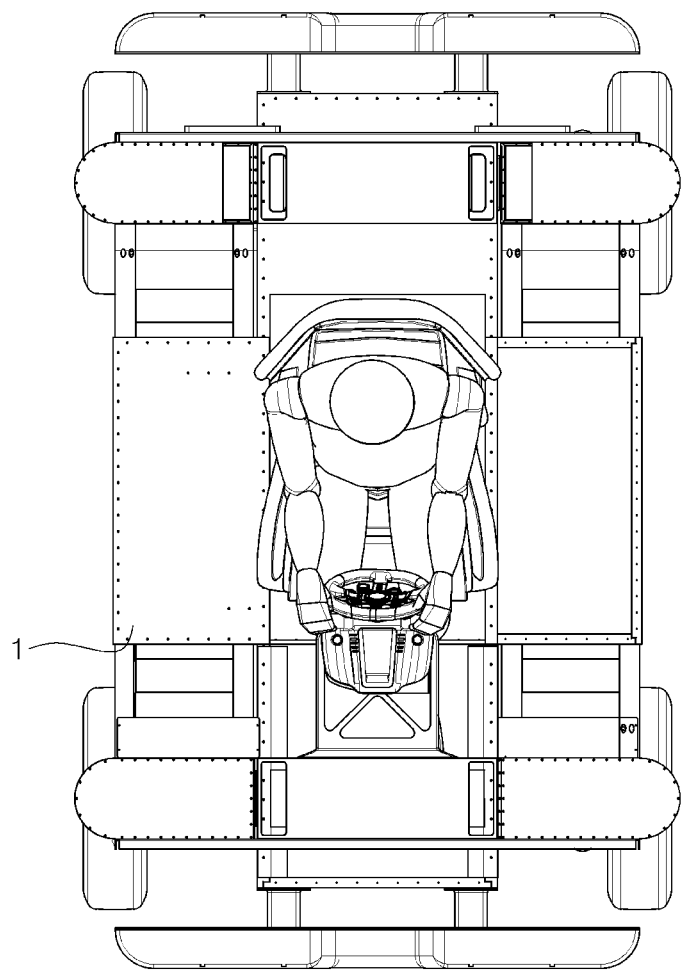
FIG. 2 is a view illustrating an example of a variable chassis platform according to embodiments of the present disclosure, when viewed from an upper side.

FIG. 1 is a view illustrating an example of the variable chassis platform 1 according to embodiments of the present disclosure. FIG. 2 is a view illustrating the example of the variable chassis platform 1 according to embodiments of the present disclosure, when viewed from an upper side.

The cabin 2 may be seated on an upper side of the variable chassis platform 1, and may cover a portion of the variable chassis platform 1 from an upper side thereof.

Figure 3:
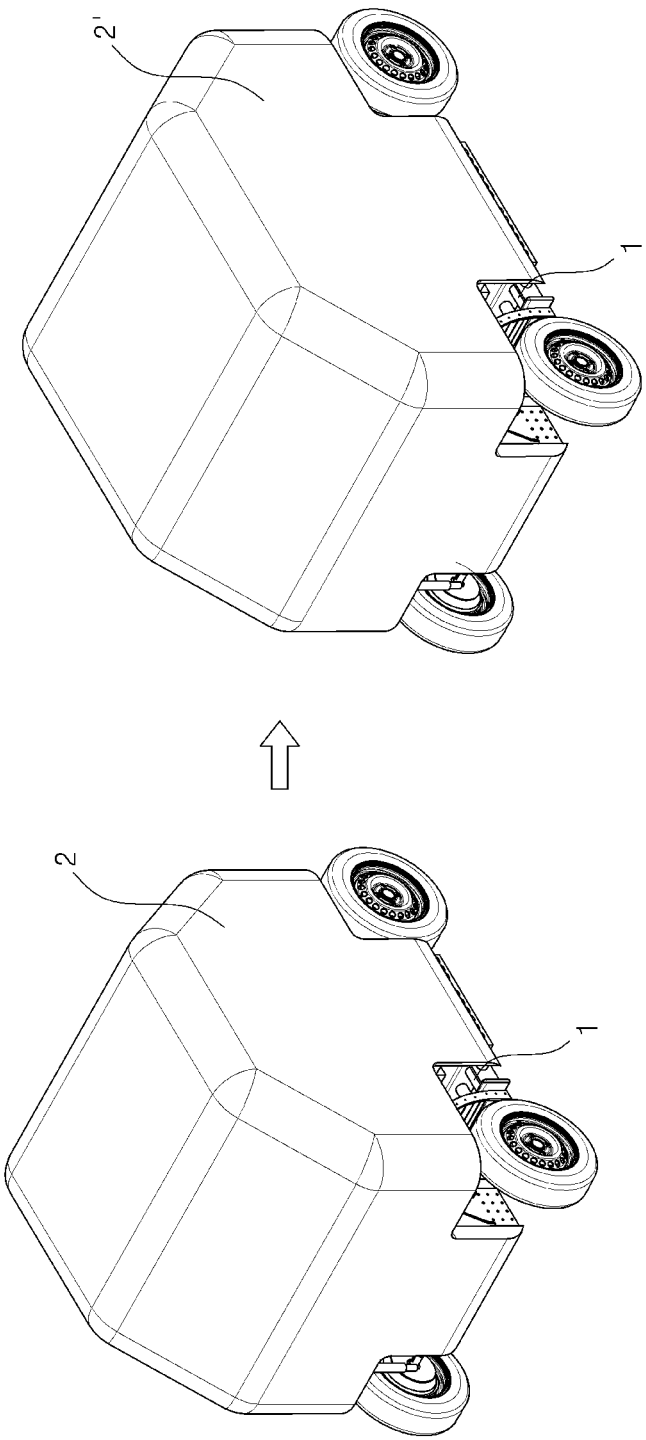
FIG. 3 illustrates a state in which two cabins having different lengths along a first direction are seated on upper sides of variable chassis platforms, respectively.

The cabins 2 and 2' may have various shapes according to a purpose of a mobility vehicle that is to be used. As an example, a cabin for a food truck may include a facility or an apparatus, such as a fuel intake, which is necessary for cooking. As another example, a cabin for an ambulance may include a facility or an apparatus, such as a defibrillator, which is necessary for an emergency situation. FIG. 3 illustrates a state in which two cabins 2 and 2' having different lengths along the first direction D1 (see FIG. 4) are seated on upper sides of the variable chassis platforms 1. As illustrated in FIG. 3, lengths of the cabins 2 and 2' along the first direction D1 may be different according to purposes thereof. Accordingly, a length of the variable chassis platform 1 along the first direction D1 also has to vary as illustrated in FIG. 3.

Hereinafter, a detailed structure of the variable chassis platform 1, by which a length thereof along the first direction D1 may vary, will be described below.

The variable chassis platform 1 may include a body part 10 and an extension part 20. The extension part 20 may protrude from the body part 10 along the first direction D1 and an opposite direction to the first direction D1.

In more detail, the body part 10 may have an interior space 11. The extension part 20 may be inserted into the interior space 11 of the body part 10 along the first direction D1 and the opposite direction thereto. A wheel part 30 may be coupled to one end of the extension part 20.

The wheel part 30 may be rotated by 360 degrees about an axis that extends in an upward/downward direction. For example, the wheel part 30 may include a shaft member, a motor member, and a wheel member. The shaft member may extend along the upward/downward direction. The motor member may rotate the shaft member about an axis that extends in the upward/downward direction. The wheel member may be coupled to a lower end of the shaft member and may contact a ground surface. The wheel member may include a wheel and a tire. The wheel part 30 may be moved not only in a forward/rearward direction of the mobility vehicle but also in a leftward/rightward direction, and a diagonal direction, in which the forward/rearward direction and the leftward/rightward direction are combined.

According to embodiments of the present disclosure, because the variable chassis platform 1 includes the extension part 20 that may be inserted into the interior space 11 of the body part 10 in the first direction D1 and the opposite direction thereto, a length of the variable chassis platform 1 along the first direction D1 may easily vary as the extension part 20 is inserted. Accordingly, because a length of a lower platform may conveniently vary according to a length of the upper cabin 2, a time for exchanging the upper cabin 2 may be shortened and an operation may be simplified.

The variable chassis platform 1 according to an embodiment of the present disclosure may include a fixing part 40. The fixing part 40 may fix the extension part 20 to a specific location. That is, according to embodiments of the present disclosure, because the extension part 20 may be fixed to the specific location through the fixing part 40, the length of the variable chassis platform 1 along the first direction D1 may be prevented from varying against an intention of a driver or a user.

Hereinafter, three embodiments of the variable chassis platform 1 will be described below. The three embodiments are different in methods for varying the length of the variable chassis platform 1 along the first direction D1.

First Embodiment

Figure 4:
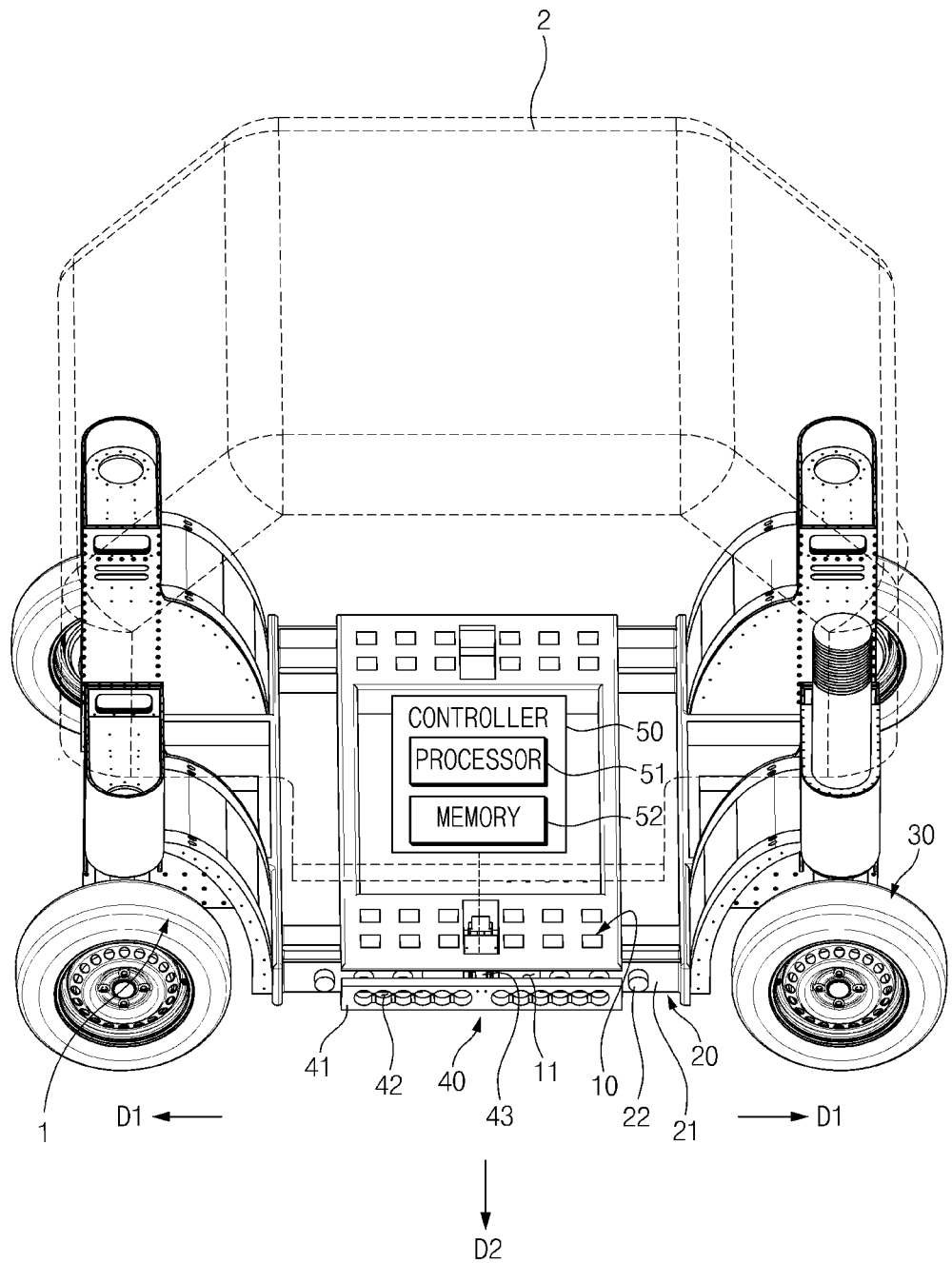
FIG. 4 is a view illustrating a variable chassis platform according to a first embodiment of the present disclosure.
Figure 5:
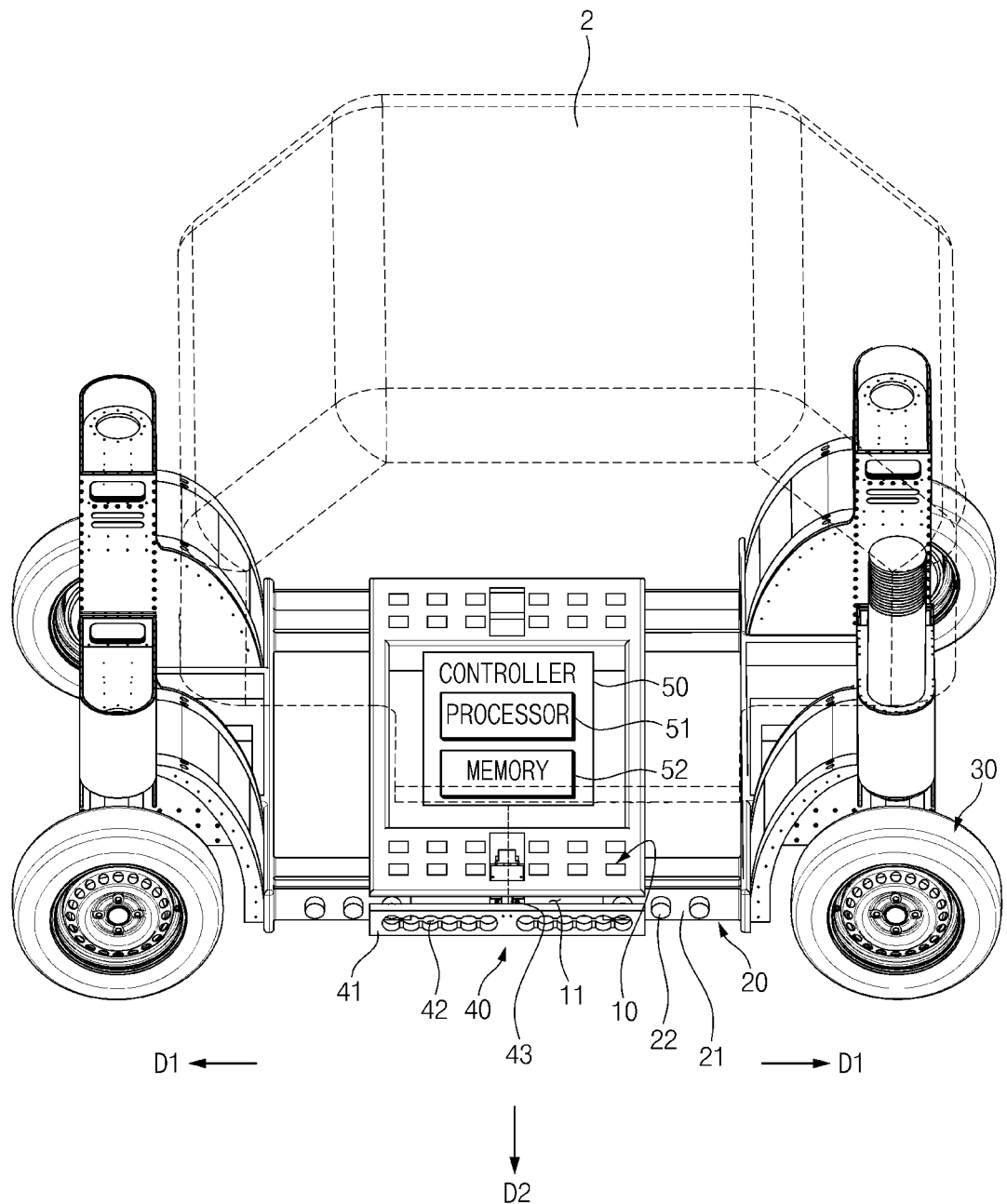
FIG. 5 is a view illustrating a state in which an extension part in FIG. 4 is moved in a first direction.
Figure 6:
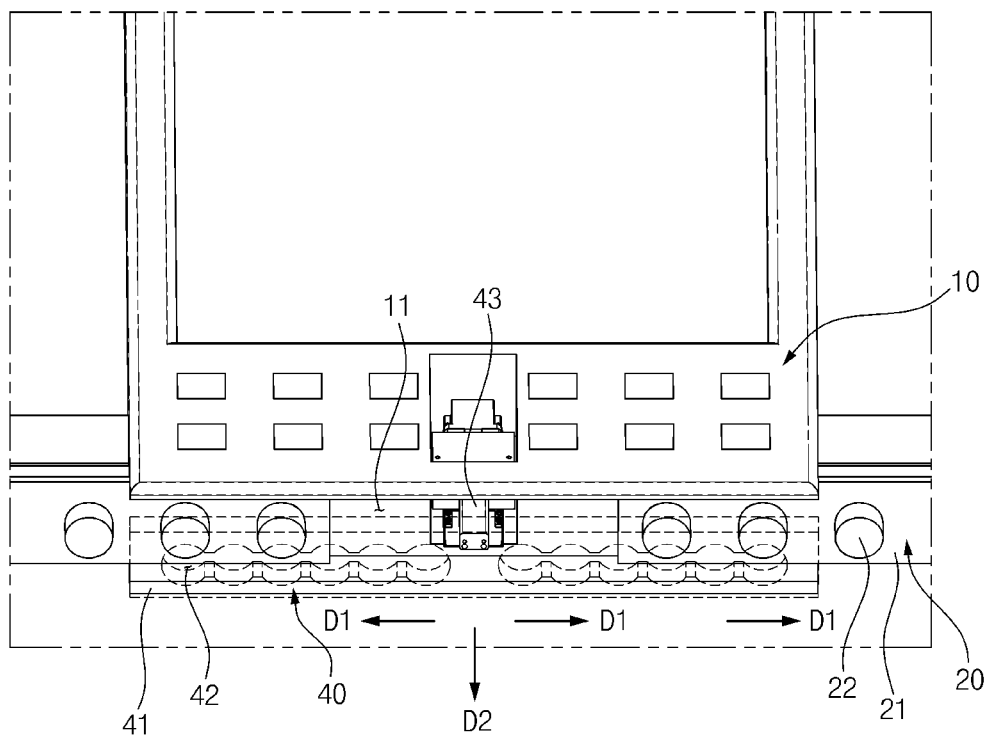
FIG. 6 is an enlarged view of FIG. 4.

FIG. 4 is a view illustrating a variable chassis platform according to a first embodiment of the present disclosure. FIG. 5 is a view illustrating a state in which the extension part 20 in FIG. 4 is moved in the first direction D1. FIG. 6 is an enlarged view of FIG. 4.

The extension part 20 of the variable chassis platform 1 according to the first embodiment may include the extension member 21 and a protrusion member 22. The extension member 21 may extend along the first direction D1. The protrusion member 22 may protrude from the extension member 21 in a second direction D2. The second direction D2 may be a direction that crosses the first direction D1. For example, as illustrated in FIG. 4, when the first direction D1 is a forward/rearward direction, the second direction D2 in the first embodiment may be a direction that faces a left side or a right side.

The fixing part 40 may include a fixing member 41 and a plurality of holes 42. The fixing member 41 may be moved along the second direction D2. The plurality of holes 42 may be formed in the fixing member 41, and may be arranged along the first direction D1 such that the protrusion member 22 may be inserted thereinto. The plurality of holes 42 may be connected to each other or may have separate shapes.

Furthermore, the fixing part 40 may further include an operation member 43. The operation member 43 may be coupled to the fixing member 41 and the body part 10. The operation member 43 may move the fixing member 41 forward and rearward in the second direction D2 and an opposite direction thereto. The operation member 43 may be a linear motor.

The operation member 43 may be connected to a controller 50. The controller 50 may control the operation member 43 such that the fixing member 41 is moved forward and rearward in the second direction D2. The controller 50 may include a processor 51 and a memory 52. The processor 51 may include a microprocessor such as a field programmable gate array (FPGA), an application specific integrated circuit (ASIC), or a central processing unit (CPU). The memory 52 may store instructions that are bases for generating commands for determining an operation of the operation member 43 by the processor 51. The memory 52 may be data storage such as a hard disk drive (HDD), a solid state drive (SSD), a volatile medium, and a nonvolatile medium.

Hereinafter, an operation of the variable chassis platform 1 according to the first embodiment will be described below. The operation of the variable chassis platform 1 may be an operation of increasing or decreasing the length of the variable chassis platform 1 in the first direction D1. Here, an operation of increasing the length of the variable chassis platform in the first direction D1 will be described below.

First, the operation member 43 moves the fixing member 41 in the second direction D2. Accordingly, the protrusion member 22 that is inserted through one of the plurality of holes 42 is extracted from the hole 42.

Second, the wheel part 30 is moved in the first direction D1.

Finally, when the movements of the wheel part 30 and the extension member 21 are ended, the operation member 43 moves the fixing member 41 in the opposite direction to the second direction D2. Accordingly, the protrusion member 22 is inserted into, among the plurality of holes 42, another hole, and a location of the extension member 21 is fixed.

Second Embodiment

Figure 7:
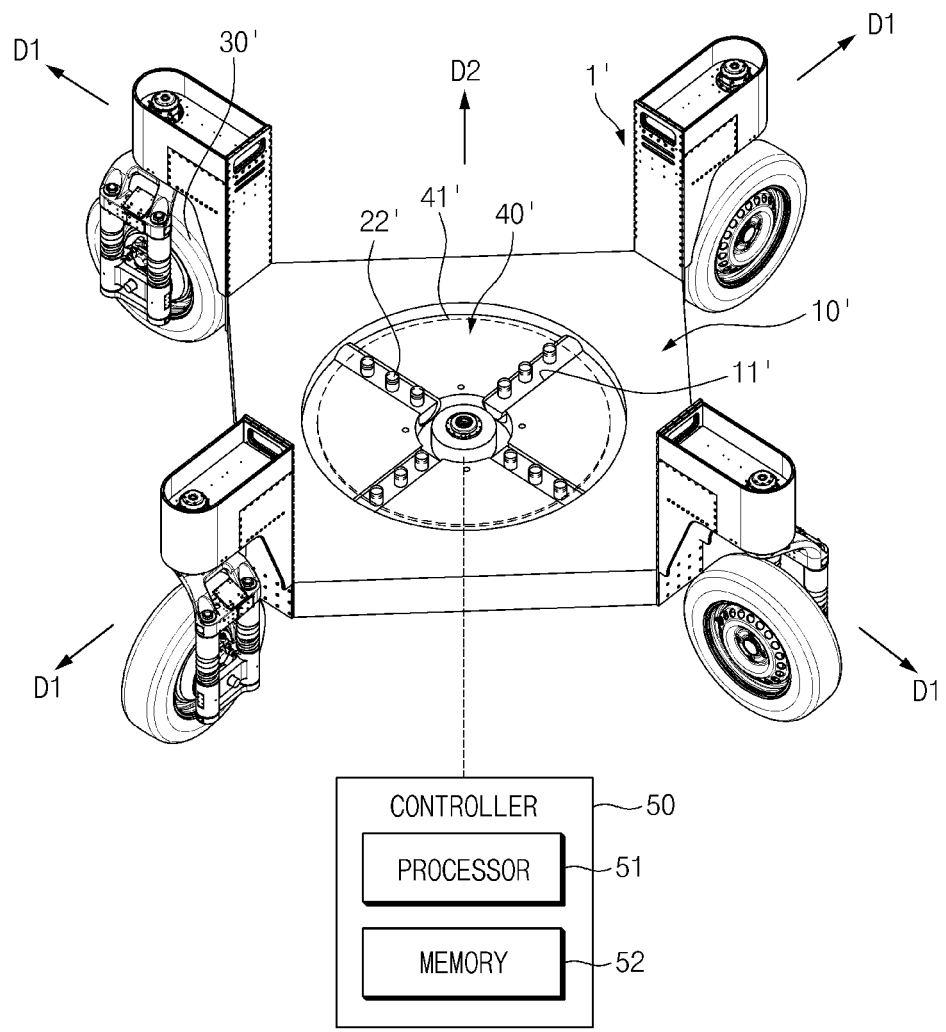
FIG. 7 is a view illustrating a variable chassis platform according to a second embodiment of the present disclosure.
Figure 8:
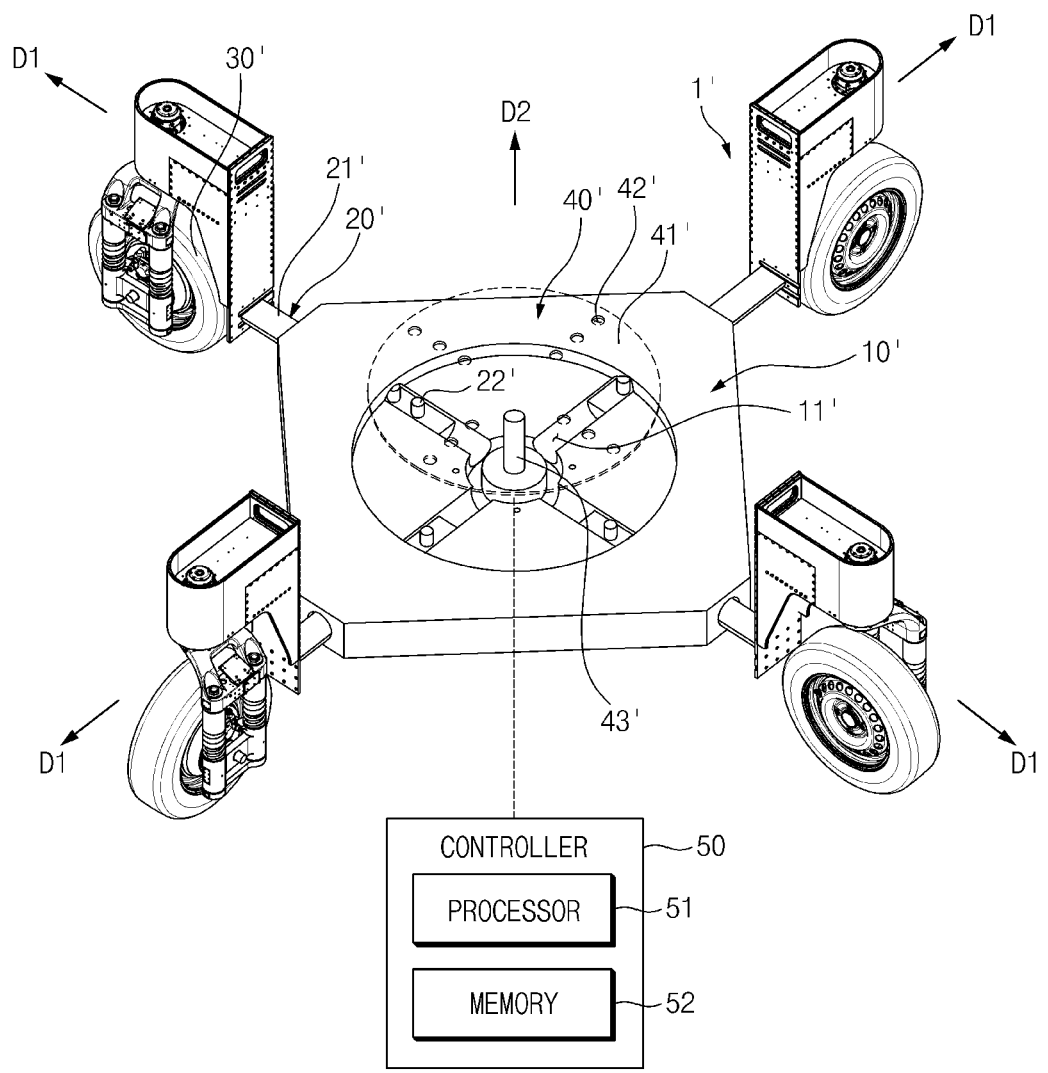
FIG. 8 is a view illustrating a state in which an extension part in FIG. 7 is moved in a first direction.
Figure 9:
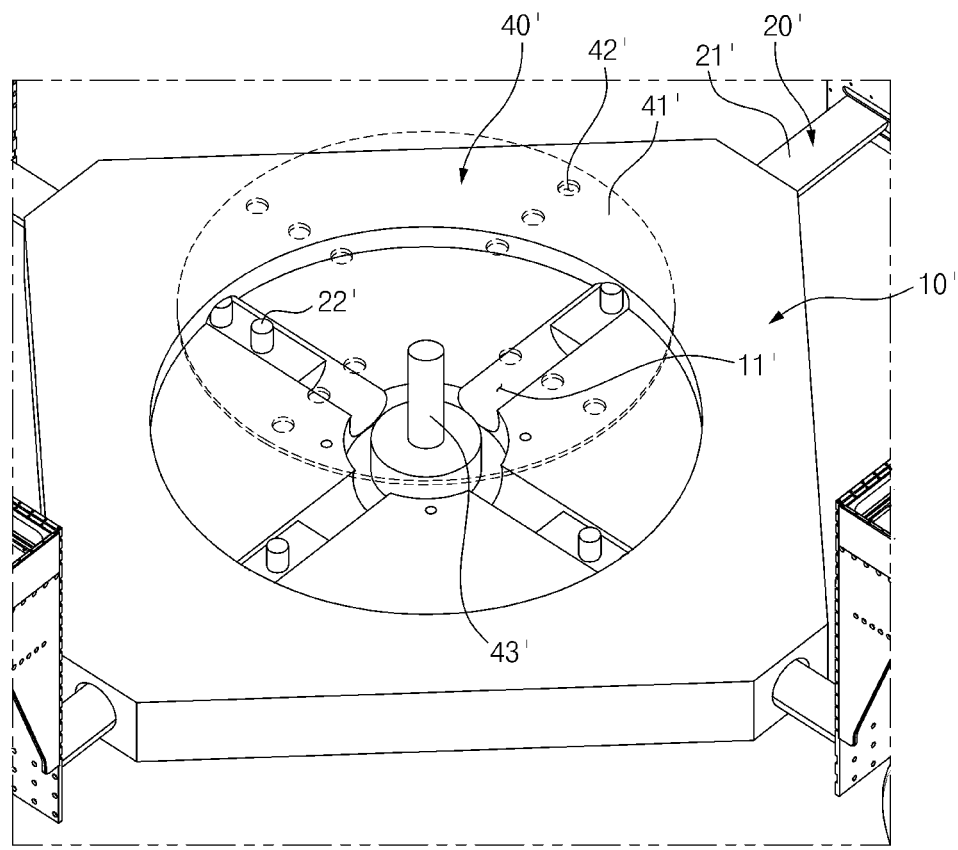
FIG. 9 is an enlarged view of FIG. 8.

FIG. 7 is a view illustrating a variable chassis platform 1' according to a second embodiment of the present disclosure. FIG. 8 is a view illustrating a state in which the extension part 20 in FIG. 7 is moved in the first direction D1. FIG. 9 is an enlarged view of FIG. 8.

Hereinafter, the variable chassis platform 1' according to the second embodiment will be described below with reference to FIGS. 7 to 9. The variable chassis platform 1' according to the second embodiment is different from the first embodiment in that a scheme of fixing a location of an extension part 20', in particular, the second direction D2 is an upward direction. The same or corresponding reference numerals are given to configurations that are the same as or correspond to those of the variable chassis platform 1 according to the first embodiment, and a detailed description thereof will be omitted.

According to the second embodiment of the present disclosure, the extension part 20' may include an extension member 21' and a protrusion member 22'. The extension member 21' may extend along the first direction D1. Here, the first direction D1 may be a direction that crosses an extension direction of a body part 10'. That is, in the second embodiment, the first direction D1 is parallel to a horizontal direction, and may be understood as a diagonal direction that defines a specific angle with a forward/rearward direction and a leftward/rightward direction of the body part 10'. The protrusion member 22' may protrude upwards from the extension member 21'.

A fixing part 40' may include a fixing member 41' and a plurality of holes 42'. The fixing member 41' may be moved along the upward/downward direction. The plurality of holes 42' may be formed in the fixing member 41', and may be arranged along the first direction D1 such that the protrusion member 22' may be inserted thereinto. The plurality of holes 42' may be connected to each other or may have separate shapes.

Furthermore, the fixing part 40' may further include an operation member 43'. The operation member 43' may be coupled to the fixing member 41' and the body part 10'. The operation member 43' may move the fixing member 41' forward and rearward along the upward/downward direction. The operation member 43' may be a linear motor.

Hereinafter, an operation of the variable chassis platform 1' according to the second embodiment will be described below. The operation of the variable chassis platform 1' may be an operation of increasing or decreasing a protrusion length of the extension member 21'. Here, an operation of increasing the protrusion length of the extension member 21' will be described below.

First, the operation member 43' moves the fixing member 41' upwards. Accordingly, the protrusion member 22' that is inserted through one of the plurality of holes 42' is extracted from the hole 42'.

Second, the wheel part 30' is moved in the first direction D1.

Finally, when the movements of the wheel part 30' and the extension member 21' are ended, the operation member 43' moves the fixing member 41' downwards. Accordingly, the protrusion member 22' is inserted into, among the plurality of holes 42', another hole 42', and a location of the extension member 21' is fixed.

Third Embodiment

Figure 10:
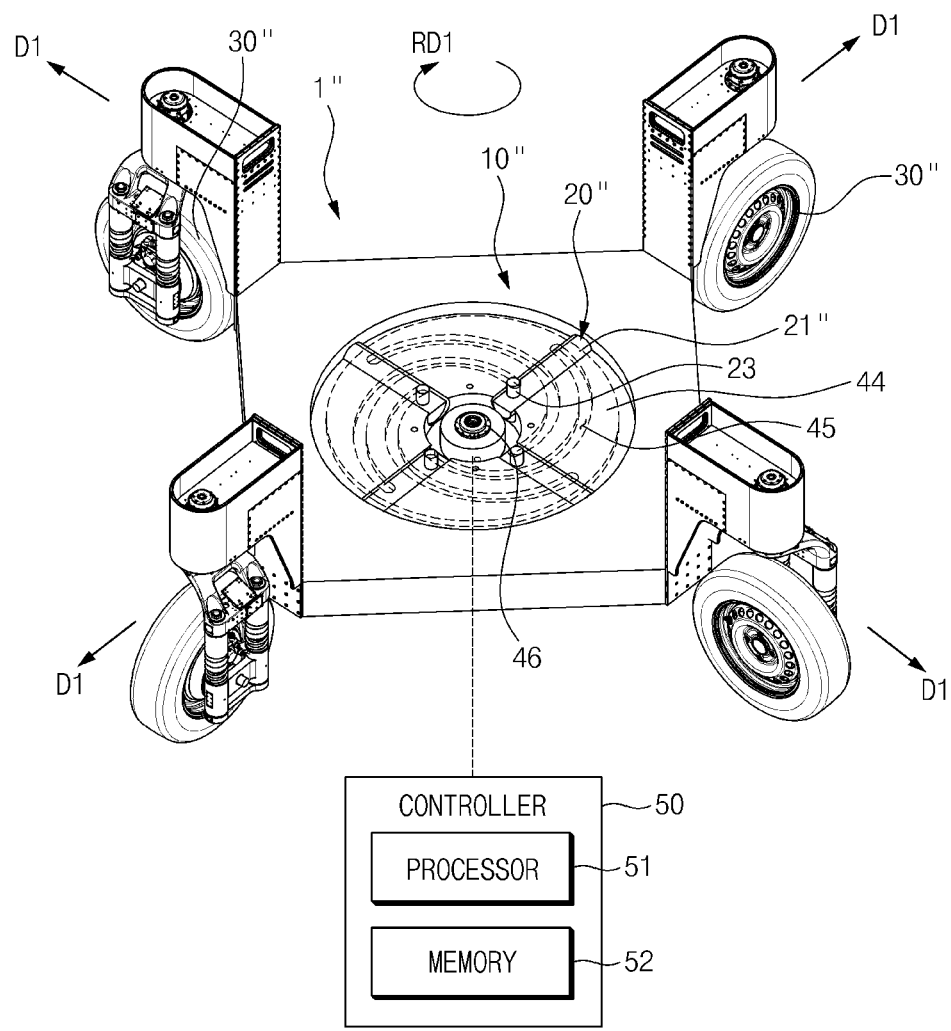
FIG. 10 is a view illustrating a variable chassis platform according to a third embodiment of the present disclosure.
Figure 11:
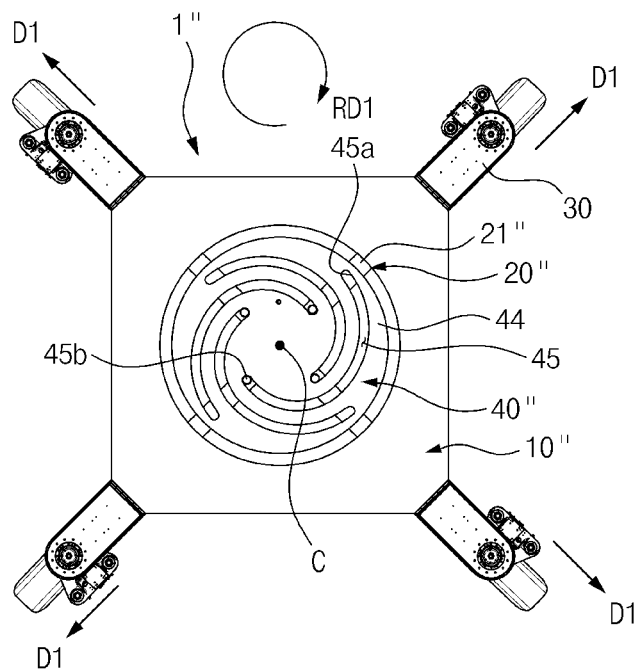
FIG. 11 is a top view of FIG. 10.
Figure 12:
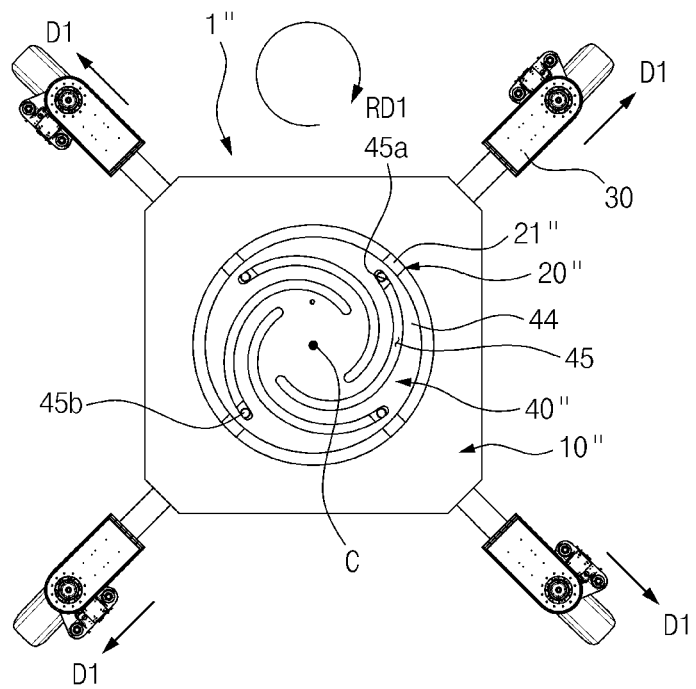
FIG. 12 is a view illustrating a state in which an extension part in FIG. 11 is moved in a first direction.
Figure 13:
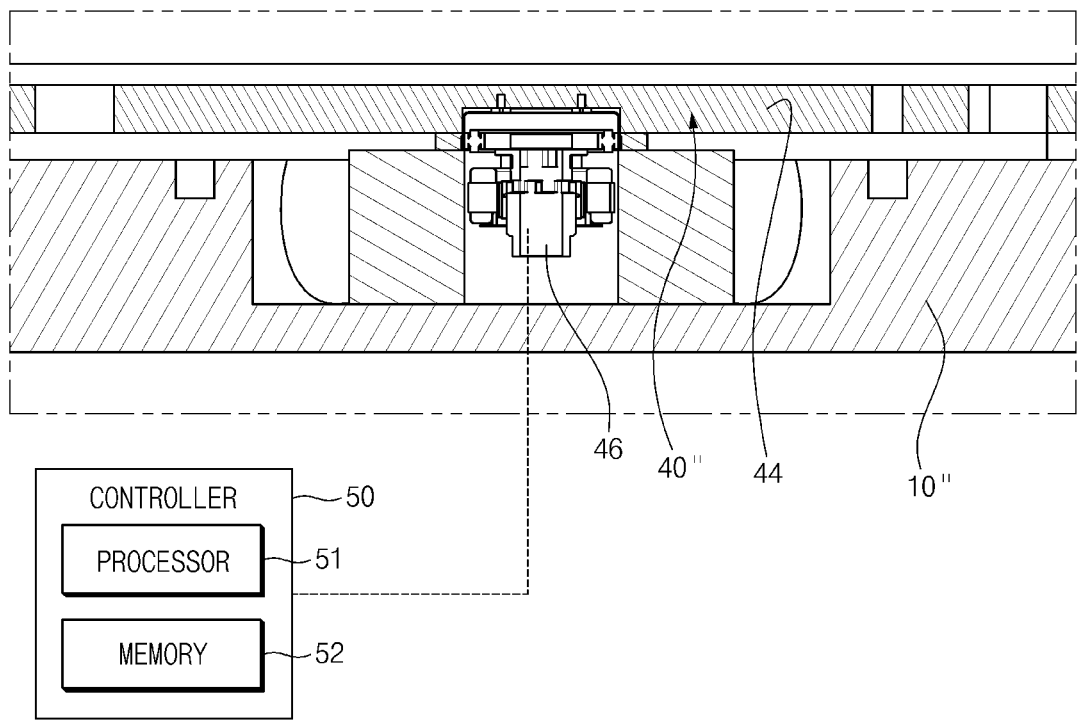
FIG. 13 is a cross-sectional view of FIG. 10.

FIG. 10 is a view illustrating a variable chassis platform 1" according to a third embodiment of the present disclosure. FIG. 11 is a top view of FIG. 10. FIG. 12 is a view illustrating a state in which an extension part 20" in FIG. 11 is moved in the first direction D1. FIG. 13 is a cross-sectional view of FIG. 10.

Hereinafter, the variable chassis platform 1" according to the third embodiment will be described below with reference to FIGS. 10 to 13. The variable chassis platform 1" according to the third embodiment is different from the second embodiment in that it includes a scheme of fixing a location of the extension part 20", in particular, a scheme of using a spiral guide groove 45. The same or corresponding reference numerals are given to configurations that are the same as or correspond to those of the variable chassis platform 1' according to the second embodiment, and a detailed description thereof will be omitted.

According to the third embodiment of the present disclosure, the extension part 20" may include a boss member 23. The boss member 23 may protrude upwards from the extension member 21".

A fixing part 40" may include a rotary member 44 and the guide groove 45. The rotary member 44 may be rotated about an axis that extends along the upward/downward direction. The rotary member 44 may be connected to a motor 46. The motor 46 may be a servo motor. The motor 46 may be connected to the controller 50.

The guide groove 45 may be formed in the rotary member 44, and may be configured such that the boss member 23 is inserted thereinto. The guide groove 45 may guide the boss member 23 such that the boss member 23 is moved along the first direction D1 when the rotary member 44 is rotated. A width of the guide groove 45 may correspond to a size of the boss member 23.

For example, the guide groove 45 may have a shape that surrounds a center of the rotary member 44, and a distance between one end 45a of the guide groove 45 in an extension direction, in which the guide groove 45 extends, and the center of the rotary member 44 is larger than a distance between an opposite end 45b of the guide groove 45 in the extension direction and the center of the rotary member 44.

Further, the guide groove 45 may have a shape, of which a distance from the center of the rotary member 44 increases as it goes to the one end 45a of the guide groove 45 in the extension direction.

FIG. 10 will be referenced for helping understanding. As illustrated in FIG. 10, the guide groove 45 may have a spiral shape, a diameter of which increases. This may be understood as being similar to an appearance of a top shell, when viewed from a top.

With reference to a mobility vehicle having four wheel parts 30", four extension parts 20" and four guide grooves 45 may be formed. Then, lines obtained by connecting ends 45a of, among the four guide grooves 45, two adjacent guide grooves 45 and the center of the rotary member 44 may be perpendicular to each other. Furthermore, lines obtained by connecting opposite ends 45b of, among the four guide grooves 45, the two adjacent guide grooves 45 and the center of the rotary member 44 may be perpendicular to each other.

As illustrated in FIG. 10, one end 45a and an opposite end 45b of the guide groove 45 in the extension direction and the center of the rotary member 44 may be disposed on one line.

Due to the shape of the guide groove 45, when the rotary member 44 is rotated in a first rotational direction RD1, the boss member 23 may be moved in the first direction D1. With reference to FIG. 10, the first rotational direction RD1 may be a clockwise direction. When the rotary member 44 is rotated in an opposite direction to the first rotational direction RD1, the boss member 23 may be moved in the opposite direction to the first direction D1. Moving the boss member 23 in the first direction D1 or the opposite direction thereto according to the rotational direction of the rotary member 44 may be based on an aspect that a movement range of the boss member 23 is limited to an interior of a space defined by the guide groove 45.

Hereinafter, an operation of the variable chassis platform 1 according to the third embodiment will be described below. The operation of the variable chassis platform 1 may be an operation of increasing or decreasing a protrusion length of the extension member 21". Here, an operation of increasing the protrusion length of the extension member 21" will be described below.

The motor 46 rotates the rotary member 44 in the first rotational direction RD1. Accordingly, the guide groove 45 also is rotated in the first rotational direction RD1, and guides the boss member 23. As the rotary member 44 is rotated in the first rotational direction RD1, a location of an area of the guide groove 45, which contacts the boss member 23, becomes farther away from the center. This may be understood as an operation of moving the boss member 23 in the first direction D1.

After the motor moves the rotary member 44 by a desired angle, rotation of the rotary member 44 is stopped. Accordingly, the boss member 23 is moved in the first direction D1, and the extension member 21" and the wheel part 30" also are moved in the first direction D1. Then, a maximum rotational angle of the motor may be equal to or less than 90 degrees.

In the variable chassis platforms 1 and 1' according to the first and second embodiments, the length of the variable chassis platforms 1 and 1' will be essentially increased in the first direction D1 discontinuously because the protrusion members 22 and 22' are disposed discontinuously. However, in the case of the variable chassis platform 1" according to the third embodiment, the length of the variable chassis platform 1" in the first direction D1 may be continuously increased because the boss member 23 is moved by the guide groove 45.

Meanwhile, in the case of the variable chassis platform 1" according to the third embodiment, protrusion lengths of the extension parts 20" toward the first direction D1 may be the same because the rotary member 44 is directly engaged with the movements of the extension members 21". However, in the case of the variable chassis platforms 1 and 1' according to the first and second embodiments, the protrusion lengths of the extension parts 20 and 20' may become different according to necessities because the fixing members 41 and 41' are not directly engaged with the movements of the extension parts 20 and 20'.

According to embodiments of the present disclosure, because the extension part that may be inserted into the interior space of the body part is included, the length of the extension part may be easily changed as the extension part is inserted, and thus a length of the lower platform may be conveniently changed according to the length of the upper cabin, whereby a time for exchanging the upper cabin may be shortened and the operation may be simplified.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure are not provided to limit the technical spirits of the present disclosure but are provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A variable chassis platform comprising:
   a body part having an interior space;
   an extension part configured to be inserted into the interior space of the body part along a first direction that crosses an upward/downward direction and an opposite direction thereto;
   a fixing part configured to fix the extension part to a specific location; and
   a wheel part coupled to one end of the extension part,
   wherein the extension part comprises:
      a front extension part insertable into the interior space of the body part, and
      a rear extension part insertable into the interior space of the body part and to reversely movable with the front extension part,
      wherein the front extension part comprises:
         a front extension member extending along the first direction, and
         a front protrusion member protruding from the front extension member in a second direction that crosses the first direction,
      wherein the rear extension part comprises:
         a rear extension member extending along the first direction, and
         a rear protrusion member protruding from the rear extension member in the second direction, and
   wherein the fixing part comprises a fixing member movable along the second direction, the fixing member comprising a plurality of holes arranged along the first direction such that the front protrusion member and the rear protrusion member are insertable thereinto.

2. The variable chassis platform of claim 1, wherein the fixing part further comprises an operation member coupled to the fixing member and the body part and configured to move the fixing member forward and rearward in the second direction and an opposite direction thereto.

3. The variable chassis platform of claim 1, wherein the wheel part comprises:
   a shaft member extending in the upward/downward direction;
   a motor member configured to rotate the shaft member about an axis that extends in the upward/downward direction; and
   a wheel member coupled to a lower end of the shaft member and configured to contact a ground surface.

4. A variable chassis platform comprising:
   a body part having an interior space;
   an extension part configured to be inserted into the interior space of the body part along a first direction that crosses an upward/downward direction and an opposite direction thereto, the extension part comprising:
      an extension member extending along the first direction; and
      a boss member protruding upward from the extension member;
   a fixing part configured to fix the extension part to a specific location; and
   a wheel part coupled to one end of the extension part,
   wherein the fixing part comprises:
      a rotary member rotatable about an axis extending along the upward/downward direction, and
      a guide groove formed in the rotary member and configured to receive the boss member, wherein the guide groove is configured to guide the boss member such that the boss member is moved along the first direction when the rotary member is rotated.

5. The variable chassis platform of claim 4, wherein:
   the guide groove has a shape that surrounds a center of the rotary member; and
   a distance between the center of the rotary member and a first end of the guide groove in an extension direction in which the guide groove extends is larger than a distance between the center of the rotary member and a second opposite end of the guide groove in the extension direction.

6. The variable chassis platform of claim 5, wherein the guide groove has the shape in which the distance from the center of the rotary member increases as the shape goes toward the first end of the guide groove in the extension direction.

7. The variable chassis platform of claim 6, wherein:
   a rotational direction from the first end toward the second opposite end of the guide groove is a first rotational direction;
   the boss member is moved in the first direction when the rotary member is rotated in the first rotational direction; and
   the boss member is moved in the opposite direction to the first direction when the rotary member is rotated in an opposite direction to the first rotational direction.

8. The variable chassis platform of claim 5, further comprising four extension parts and four guide grooves, wherein lines obtained by connecting the center of the rotary member and first ends of two adjacent guide grooves from among the four guide grooves are perpendicular to each other.

9. The variable chassis platform of claim 8, wherein lines obtained by connecting the center of the rotary member and second opposite ends of the two adjacent guide grooves are perpendicular to each other.

10. The variable chassis platform of claim 4, wherein the center of the rotary member and a first end and a second opposite end of the guide groove in an extension direction are disposed on one line.

11. The variable chassis platform of claim 4, wherein a width of the guide groove corresponds to a size of the boss member.

12. A mobility vehicle comprising:
a variable chassis platform having a length along a first direction that crosses an upward/downward direction that is variable, the variable chassis platform comprising:
   a body part; and
   an extension part protruding from the body part along the first direction and an opposite direction thereto, the extension part comprising:
      an extension member extending along the first direction; and
      a protrusion member protruding from the extension member in a second direction that crosses the first direction; and
a cabin seated on an upper side of the variable chassis platform and covering a portion of the variable chassis platform on the upper side of the variable chassis platform,
wherein the variable chassis platform further comprises a wheel part coupled to one end of the extension part, the wheel part comprising:
   a shaft member extending in the upward/downward direction,
   a motor member configured to rotate the shaft member about an axis that extends in the upward/downward direction, and
   a wheel member coupled to a lower end of the shaft member and configured to contact a ground surface.

13. The mobility vehicle of claim 12, wherein the variable chassis platform further comprises a fixing part configured to fix the extension part to a specific location, the fixing part comprising a fixing member movable along the second direction, and the fixing member comprising a plurality of holes arranged along the first direction such that the protrusion member is insertable thereinto.

14. The mobility vehicle of claim 13, wherein the fixing part further comprises an operation member coupled to the fixing member and the body part and configured to move the fixing member forward and rearward in the second direction and an opposite direction thereto.

15. The mobility vehicle of claim 12, wherein the extension part further comprises:
a boss member protruding upward from the extension member.

* * * * *